(12) United States Patent
Sankaranarayanan

(10) Patent No.: US 9,794,846 B2
(45) Date of Patent: *Oct. 17, 2017

(54) AUTOMATIC CHANNEL LAYERING IN A WI-FI COMMUNICATION SYSTEM

(71) Applicant: MERU NETWORKS, Sunnyvale, CA (US)

(72) Inventor: Srivatsan Sankaranarayanan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/866,812

(22) Filed: Sep. 25, 2015

(65) Prior Publication Data

US 2016/0112920 A1 Apr. 21, 2016

Related U.S. Application Data

(63) Continuation of application No. 13/354,264, filed on Jan. 19, 2012, now Pat. No. 9,210,587.

(51) Int. Cl.
*H04W 36/20* (2009.01)
*H04W 4/06* (2009.01)
*H04W 16/18* (2009.01)
*H04W 24/02* (2009.01)
*H04W 36/08* (2009.01)
*H04W 36/30* (2009.01)
*H04W 72/00* (2009.01)
*H04W 84/12* (2009.01)

(52) U.S. Cl.
CPC ............ *H04W 36/20* (2013.01); *H04W 4/06* (2013.01); *H04W 16/18* (2013.01); *H04W 24/02* (2013.01); *H04W 36/08* (2013.01); *H04W 36/30* (2013.01); *H04W 72/005* (2013.01); *H04W 84/12* (2013.01)

(58) Field of Classification Search
None
See application file for complete search history.

(56) References Cited

U.S. PATENT DOCUMENTS

| 6,625,134 B1 * | 9/2003 | Ji ........................... H04W 36/18 370/331 |
| 6,631,264 B1 * | 10/2003 | Leickel ................. H04W 36/30 455/434 |
| 8,744,391 B2 * | 6/2014 | Tenbrook .............. H04W 48/16 455/226.2 |

(Continued)

*Primary Examiner* — Khaled Kassim

(57) ABSTRACT

Deploying multiple access points on multiple wireless communication channels to optimize coverage area. Additional channels provide additional communication capability which multiple AP's, and their associated stations, can collectively use. An additional set of AP's can be disposed in the additional communication channel, with multiple communication channels possibly physically intersecting. The system control element collects information from devices in the wireless communication system, and automatically configures which AP is assigned to which communication channel. The system control element determines which AP's are servicing which physical locations, in response to feedback from AP's and stations in those locations. The system control element assigns, or re-assigns, AP's in each physical location, with the effect of optimizing coverage.

11 Claims, 2 Drawing Sheets

(56) References Cited

U.S. PATENT DOCUMENTS

| | | | | |
|---|---|---|---|---|
| 2002/0090942 | A1* | 7/2002 | Karabinis | H04B 7/18563 455/427 |
| 2003/0040319 | A1* | 2/2003 | Hansen | H04W 16/10 455/452.1 |
| 2005/0003827 | A1* | 1/2005 | Whelan | H04W 16/10 455/454 |
| 2005/0073980 | A1* | 4/2005 | Thomson | H04W 16/20 370/338 |
| 2006/0262767 | A1* | 11/2006 | Peleg | H04W 16/28 370/338 |
| 2007/0140191 | A1* | 6/2007 | Kojima | H04W 8/005 370/338 |
| 2008/0075038 | A1* | 3/2008 | Jin | H04W 16/14 370/329 |
| 2008/0117875 | A1* | 5/2008 | Bennett | H04W 36/32 370/331 |
| 2008/0130573 | A1* | 6/2008 | Lee | H04W 16/10 370/331 |
| 2009/0052382 | A1* | 2/2009 | Stephenson | H04W 16/14 370/329 |
| 2009/0247206 | A1* | 10/2009 | Yacono | H04W 24/02 455/515 |
| 2009/0298515 | A1* | 12/2009 | Czaja | H04L 7/041 455/456.5 |
| 2010/0297989 | A1* | 11/2010 | Noldus | H04W 8/28 455/417 |
| 2011/0228829 | A1* | 9/2011 | Kazarnovski | H04W 72/085 375/220 |

* cited by examiner

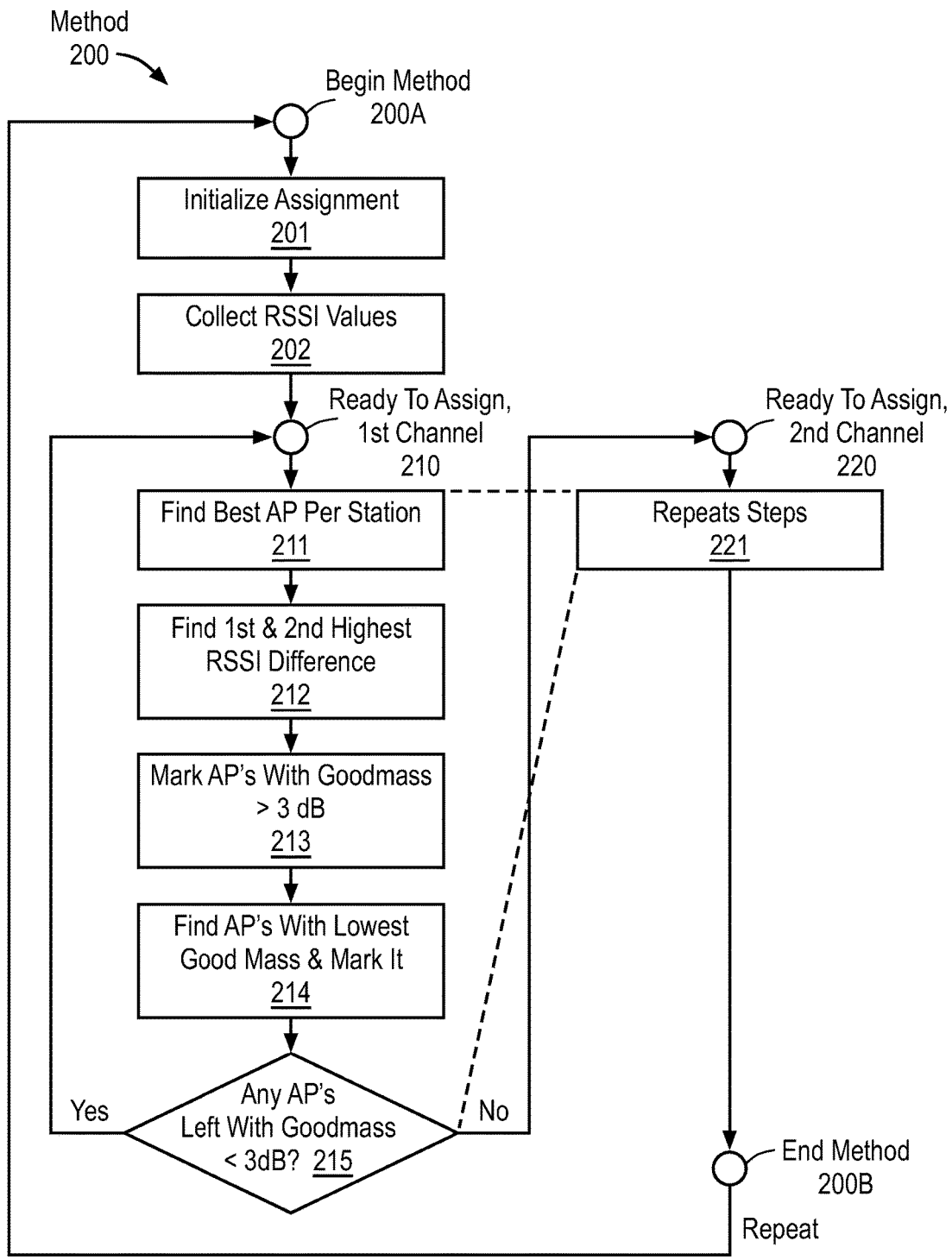
FIG. 2   (275.1064.01)

AUTOMATIC CHANNEL LAYERING IN A WI-FI COMMUNICATION SYSTEM

CROSS-REFERENCES TO RELATED APPLICATIONS

This application claims the benefit of priority as a continuation of U.S. patent application Ser. No. 13/354,264, filed Jan. 19, 2012, entitled AUTOMATIC CHANNEL LAYERING IN A WI-FI COMMUNICATION SYSTEM, by Sirivatsan Sankaranarayanan, which is related to U.S. Pat. No. 7,826,426, issued Nov. 2, 2010, entitled SEAMLESS MOBILIBY IN WIRELESS NETWORKS, issued to Vaduvur Bharghavan et al., the entire contents of both being hereby incorporated by reference.

FIELD OF THE INVENTION

This invention generally relates to a Wi-Fi communication system, and more specifically, to automatic channel layering in a Wi-Fi communication system.

BACKGROUND

In wireless communication using an IEEE 802.11 protocol, wireless stations connect to a wireless communication system using access points ("AP's"). Each AP services those stations which it is best suited to service, typically those stations which are nearest or otherwise have best signal strength, and for which there is little or no interference with other access points. If the AP's are spaced too far apart, there might be regions ("coverage holes") in which coverage by the system is limited, spotty, or even nonexistent. For example, this can be due to difficulty by stations in finding an access point with adequate signal strength. On the other hand, if the AP's are spaced too closely, there might be regions in which the wireless communication system is operating inefficiently. For example, this can be due to difficulty by access points in communicating without interference.

In a system described in the Incorporated Disclosures, a system control element selects, for each station, which AP will communicate with, and service, that station. Multiple AP's can each communicate with their associated stations in the communication system. This has the effect that multiple AP's can be disposed nearby, even co-located, and can configured to operate in the same channel without leaving any coverage holes. However, one problem is that channel capacity is limited by interference between the set of devices using the same channel.

BRIEF SUMMARY

We provide techniques for deploying multiple access points on multiple wireless communication channels, without leaving any significant areas of limited coverage (sometimes referred to herein as "coverage holes").

In a wireless communication system organized having multiple channels, we provide an association between AP's and those channels. The association maximizes coverage by AP's servicing stations attempting to use the communication system. This has the effect that each additional channel provides additional communication capability which additional AP's, and their associated stations, can collectively use once those additional AP's are assigned to those additional communication channels. This also has the effect that AP's can be physically close to prevent coverage holes in service, without interfering with each other.

The system control element collects information from devices in the wireless communication system, and automatically configures which AP is assigned to which mobile stations. The system control element determines which AP's are servicing which physical locations, in response to feedback from AP's and stations in those locations. The system control element assigns, or re-assigns, AP's in each physical location, with the effect of achieving maximum coverage. This has one effect that the system control element can balance loading on each communication channel by assigning or re-assigning stations to its choice of communication channel. The system control element can, from time to time, collect new information and assign or re-assign AP's to channels, with the effect of re-achieving maximum coverage even after conditions change.

BRIEF DESCRIPTION OF THE DRAWINGS

FIG. 2 shows a conceptual diagram of a method.

DETAILED DESCRIPTION

Terms and Phrases

Figure 1:
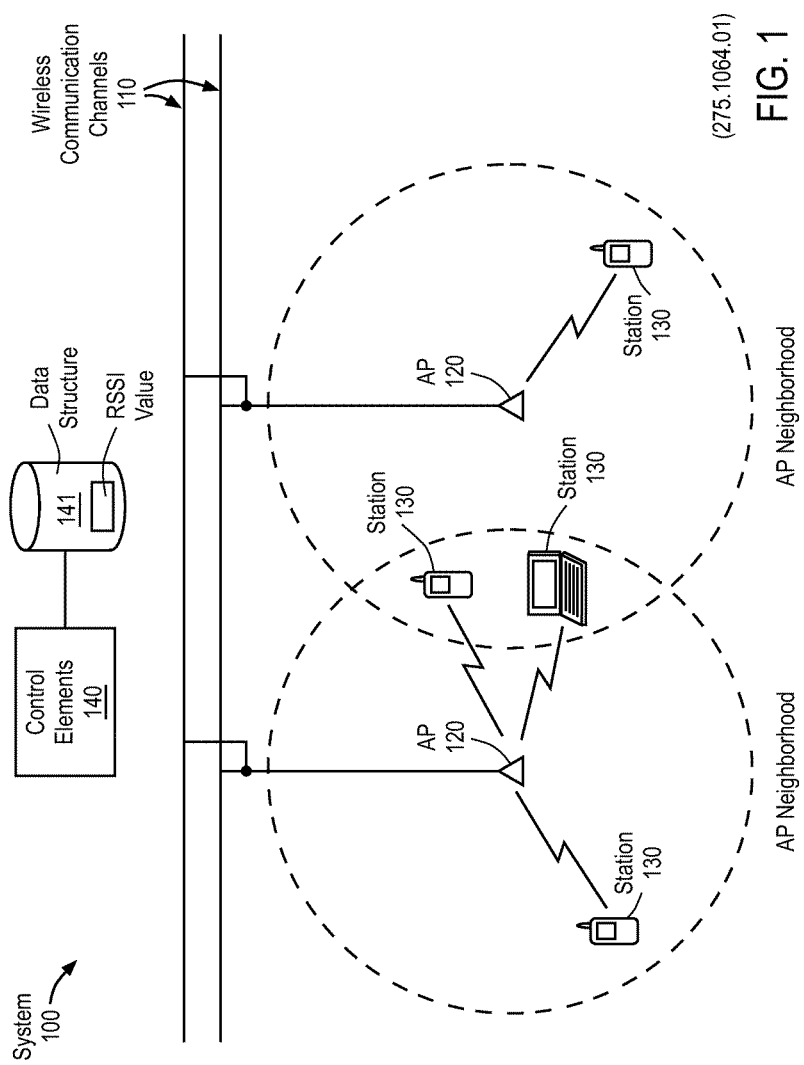
FIG. 1 shows a conceptual diagram of a wireless communication system.

The following terms and phrases include their most general applicable form. Each is described in a manner that is illustrative, not limiting.

The phrase "access point", and the term "AP", and variants thereof, generally refers to any device capable of coupling wireless messages between a wireless station and a wired communication medium. Access points might be coupled directly to a wired medium, such as for example a LAN or other wired network. Alternatively, access points might be coupled indirectly to a wired medium, such as for example using other access points, wireless repeaters, or otherwise.

In one embodiment, particular access points might be movable in regions related to a wireless communication system. For example and without limitation, the system might direct those particular access points to be moved to locations where communication is problematic, or to locations suitable for assisting in determining communication problems or remedies therefor.

The terms "assignment", "association", and variants thereof, when used with respect to AP's and channels, generally refer to any method or system in which those AP's are directed to, or otherwise operate to, communicate using those channels. For example, the system control element might assign an AP to a particular channel using a message sent to that AP, or by making an entry in an AP/channel table that the AP reviews, or otherwise.

The phrases "wireless communication", "wireless network", and variants thereof, generally refer to any method or system in which data or messages are sent, received, or maintained, using a wireless medium. For example and without limitation, the wireless medium might include electromagnetic radiation, such as radio frequencies. In one embodiment, wireless communication is performed using a communication protocol family such as IEEE 802.11, or a variant thereof. However, in the context of the invention, there is no particular requirement for any such limitation.

The phrase "wireless station", and variants thereof, generally refers to any end-user device capable of communicating using wireless messages in a wireless communication system. For example and without limitation, wireless stations might include cellular phones, laptop computers, netbooks (such as the "iPad"), or other devices. Wireless stations might be mobile (and might sometimes be referred to herein as "mobile stations") or might be stationary.

In one embodiment, particular access points might be directed by a wireless communication system to perform as wireless stations, exchanging messages with those access points performing the functions generally associated with access points; in such cases, those particular access points performing as wireless stations might be sometimes treated herein as if they were wireless stations.

GENERALITY OF THE DESCRIPTION

Technologies shown or suggested by this description should also be thought of in their most general possible form. This includes, without limitation, the following:

The phrases and terms "constantly," "continually," "from time to time," "occasionally," "periodically" (and similar phrases and terms) generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "methods, physical articles, and systems," "techniques" (and similar phrases and terms) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The term "relatively" (and similar phrases and terms) generally indicates any relationship in which a comparison is possible, including without limitation "relatively less," "relatively more," and the like. In the context of the invention, where a measure or value is indicated to have a relationship "relatively," that relationship need not be precise, need not be well-defined, need not be by comparison with any particular or specific other measure or value. For example and without limitation, in cases in which a measure or value is "relatively increased" or "relatively more," that comparison need not be with respect to any known measure or value, but might be with respect to a measure or value held by that measurement or value at another place or time.

The term "substantially" (and similar phrases and terms) generally indicates any case or circumstance in which a determination, measure, value, or otherwise, is equal, equivalent, nearly equal, nearly equivalent, or approximately, what the measure or value is recited. The terms "substantially all" and "substantially none" (and similar phrases and terms) generally indicate any case or circumstance in which all but a relatively minor amount or number (for "substantially all") or none but a relatively minor amount or number (for "substantially none") have the stated property. The terms "substantial effect" (and similar phrases and terms) generally indicate any case or circumstance in which an effect might be detected or determined.

The phrases "this application," "this description" (and similar phrases and terms) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Figures and Text

FIG. 1

FIG. 1 shows a conceptual diagram of a wireless communication system.

A wireless communication system 100 includes elements shown in the FIG. 1, including a set of wireless communication channels 110, one or more AP's 120, one or more stations 130, and at least one system control element 140.

The wireless communication channels 110 each include a physical communication layer, such as for example a physical communication layer used by an IEEE 802.11 protocol or a variant thereof. The physical communication layer provides devices coupled to the system 100 the ability to send and receive messages using a wireless substrate, such as for example using electromagnetic radiation in a radio frequency band. As described herein, there are multiple such channels 110 on which communication might occur separately without substantial interference, which might be separable using distinct CDMA codes, distinct frequencies, MIMO separation, distinct TDMA time slots, or otherwise. For example, in the 2.4 GHz ISM band used by IEEE 802.11 protocols there are 3 20-MHz channels, while in the 5 GHz band there are at least 4 40-MHz channels in most countries, and up to 12 40-MHz channels in some countries.

Each wireless communication channel 110 is conceptually represented in the figure as a separate network, as if each communication channel 110 were independently accessible by each AP 120. In one embodiment, each communication channel 110 has an independent FDMA frequency, such as described above with respect to the 2.4 GHz band and the 5 GHz band used by IEEE 802.11 protocols, and each AP 120 includes a radio capable of being tuned to either (1) any one of those FDMA frequencies in the 2.4 GHz band, or (2) any one of those FDMA frequencies in the 5 GHz band. This has the effect that each AP 120 with a radio tunable in the 2.4 GHz band can be assigned, if desired, to any one of the communication channels 110 in the 2.4 GHz band, and each AP 120 with a radio tunable in the 5 GHz band can be assigned, if desired, to any one of the communication channels 110 in the 5 GHz band.

This also has the effect that multiple AP's 120 can communicate concurrently on distinct communication channels 110 without interference. For example, if two AP's 120 are each transmitting or listening on distinct communication channels 110 (such as for example, distinct frequencies), interference between those two AP's 120 should be substantially zero, allowing those two AP's 120 to each act as if the other AP 120 was not present. Thus, if two or more AP's 120 are substantially co-located, those AP's 120 might be assigned to distinct communication channels 110 so as to allow them to service stations concurrently without interference.

If an AP 120 has more than one radio, each radio can be assigned to a separate communication channel 110. In one embodiment, this might be treated as if the AP 120 with more than one radio emulates a plurality of co-located AP's 120, or might be alternatively treated as if the AP 120 with more than one radio is concurrently assigned to a plurality of communication channels 110. Similarly, it might occur that a plurality of AP's 120, collectively having more than one radio, or otherwise capable of collectively operating on more than one communication channel 110, might cooperate so as to collectively emulate a plurality of co-located AP's 120, or might cooperate so as to collectively act like a single AP 120 which is concurrently assigned to more than one communication channel 110.

In one embodiment, an AP 120 might have multiple radios, each of which is configured to operate on a particular frequency band. For example, one particular frequency band could be either the 2.4 Ghz band or the 5 Ghz band described above, or possibly some additional or other frequency band that might be envisaged in the future. In this example, the AP 120 with multiple radios can be considered as if it included more than one collocated AP 120, each of which with a single radio capable of operating on its own, separately configured, frequency band. Subsequently, distinct sets of AP's 120 are formed in every frequency band such that the AP's 120 from each of those distinct sets operate on the same frequency band. The method described herein can then be applied separately on each of the sets of AP's 120, with the effect of arriving at an optimal assignment of radios to channels within each particular frequency band.

While this application primarily describes systems in which each AP 120 has only a single radio and is therefore capable of communication on only a single communication channel 110 at once, in the context of the invention, there is no particular requirement for any such limitation.

While this application primarily describes techniques in which each AP 120 is assigned to a single communication channel 110 (or a single communication channel 110 for each of its radios), in the context of the invention, there is no particular reason for any such limitation. For example, one or more AP's 120 might be directed to switch between or among two or more communication channels 110, with the effect that those AP's 120 might listen on more than one communication channel 110, although not simultaneously, and with the effect that those AP's 120 might transmit on more than one communication channel 110, although not simultaneously. AP's 120 directed to act in that manner might switch communication channels 110 periodically, or from time to time in response to one or more stimuli.

However, it might be the case that not all of the communication channels 110 can be reached by all of the AP's 120. For example, as described above, in one embodiment it occurs that some AP's 120 are only able to reach the communication channels 110 in the 2.4 GHz band, and lack ability to reach the communication channels 110 in the 5 GHz band, while other AP's 120 are only able to reach the communication channels 110 in the 5 GHz band, and lack ability to reach the communication channels 110 in the 2.4 GHz band. The control element 140 would assign those AP's 120 only to communication channels 110 they are actually able to reach. For example, the control element 140 might attempt to determine a covering set for the wireless communication system 100 by first restricting its attention to AP's 120 to a particular frequency band.

While this application primarily describes systems in which each AP 120 has is capable of communication on all the frequencies of a particular frequency band (e.g., the 2.4 GHz band or the 5 GHz band), in the context of the invention, there is no particular requirement for any such limitation. As described below, the control element 140 is generally able to assign AP's 120 to any communication channel 110, and will generally make those assignments in response to physical proximity and other coverage factors.

The control element 140 determines, from time to time for each station 130, which AP 120 will communicate with that station 130 and service it. This has the effect that each station 130 sees each channel 110 as a single communication system, through which the station 130 might move about without having to attend to handoffs between AP's 120. Even if the station 130 does not physically move, the control element 140 can re-assign the station 130 to a different AP 120 where that might provide improved service to the station 130. For a first example, in electromagnetic conditions might change, such as due to increased or decreased amounts of interference from other devices. For a second example, the number of stations 130, or the demand placed on the communication system by stations 130, in the vicinity of AP's 120 might change over time, to which the control element 140 can respond by re-associating AP's 120 with stations 130, such as possibly to balance the load on AP's 120 to amounts commensurate with what those AP's 120 can handle.

Each AP 120 reports the RSSI value it has for each station 130 it can hear, even if that station 130 is not then currently assigned to that AP 120. This has the effect that the control element 140 can determine whether a station 130 would be better off re-assigned to a new AP 120. In one embodiment, the control element 140 makes the determination of whether to re-assign any particular station 130 in response to the RSSI value for each nearby AP 120, as well as in response to a measure of loading for each of those nearby AP's 120. This has the effect that the control element 140 can assign stations 130 to the AP 120 best able to service them, where "best able to service" can include factors such as how good the communication path they have with that AP 120 and whether that AP 120 has sufficient resources to service them.

While this application primarily describes a communication system 100 in which AP's 120 report their RSSI values, in the context of the invention, there is no particular requirement for any such limitation.

For a first example, AP's 120 might also report additional information to the control element 140, possibly including amount of traffic at or near each AP 120, number of stations at or near each AP 120, activity by each station 130, and other information. The control element 140 might use this additional information to determine which AP's 120 are likely to become overloaded, or which AP's 120 are likely to involve reassignment from one communication channel 110 to another to effect load-balancing. Load balancing might be desirable either to maintain a relatively even load across communication channels 110, or to maintain a relatively even load across AP's 120, or to maintain a relatively even degree of service to stations 130, or otherwise.

For a second example, the communication system 100 might include additional sensing devices 121 whose purpose is to sense information about operation of the communication system 100 and report that information to the control element 140. Those additional sensing devices 121 might report similar information as described with respect to AP's 120. Additional sensing devices 121 might be relatively simple devices in comparison with AP's 120, as they need only listen to traffic they can hear and report statistics regarding that traffic to the control element 140, without needing to actually service any stations 130.

For a third example, the control element 140 might query stations 130 for RSSI values those stations 130 report with respect to their assigned AP's 120, and might obtain similar additional information as described with respect to AP's 120. The control element 140 might require all stations 130 to report RSSI values or additional information, or might select only a subset of stations 130 to make such reports, or might distinguish between stations 130 which report more information and stations 130 which report less information. Similarly, the control element 140 might direct some stations 130 to report to their servicing AP's 120, might direct some stations 130 to report to non-servicing AP's 120, might direct some stations 130 to report to additional sensing devices 121 as described above, or otherwise.

Each AP 120 has an associated set of stations 130 serviced by that AP 120, for which the RSSI value is relatively good, that is, the ability of that AP 120 to communicate with the stations 130 it is assigned to service is relatively good compared with other stations 130. While stations 130 are often assigned to AP's 120 in response to their distance from that AP 120, in the context of the invention, there is no particular reason for any such limitation. For example, it might commonly occur that walls and other obstacles would alter the ability of an AP 120 to hear stations 130 that are physically proximate, with the effect that the group of stations 130 assigned to a particular AP 120 might have an unusual boundary at or near an obstacle.

The control element 140 receives status messages from each AP 120, those status messages reporting at least an RSSI (received signal strength indicator) value for each station 130 that AP 120 can hear. The control element 140 interprets those status messages, or has those status messages interpreted for it by an auxiliary device, and maintains those RSSI values in an data structure 141. The data structure 141 might be maintained either at the control element 140, or at another device accessible by the control element 140.

FIG. 2

FIG. 2 shows a conceptual diagram of a method.

A method 200 includes a set of flow points and labels and shown in the figure, including at least: a flow point 200A indicating a beginning of the method, a flow point 210 that the method is ready to assign AP's 120 to a first channel 110, a flow point 220 indicating that the method is ready to assign AP's 120 to a next channel 110, and a flow point 200B indicating an end of the method.

Beginning of Method

The flow point 200A indicates a beginning of the method 200. In one embodiment, the method 200 is triggered from time to time, such as (1) whenever the control element 140 determines that the wireless communication system is not best using its channel capacity, (2) whenever a sufficient time passes, or otherwise.

At a step 201, the method 200 initializes its assignment of all AP's 120 to a 1st communication channel 110, and initializes a "goodness-index" value to zero for each AP 120. The "goodness-index" value generally indicates whether the AP 120 is properly assigned to the communication channel 110 to which it is already assigned.

As described herein, the method 200 begins with all AP's 120 generally assigned to the same communication channel 110. However, in the context of the invention, there is no particular requirement for any such limitation. For example, as noted above, it might occur that some AP's 120 are limited to only a particular subset of communication channels 110. It might be advantageous for the control element 140 to begin the method 200 with those AP's 120 whose operating capability is limited to start assigned to one of the limited communication channels 110, such as for example, a limited set of operating frequencies, which they are capable of using.

At a step 202, the method 200 collects a set of RSSI values reported by each AP 120 for each station 130 it can hear. The collected RSSI values are maintained by the method 200 in a data structure 141. In one embodiment, the data structure 141 might be maintained at the control element 140, such as in memory or mass storage coupled to a processor performing the operations associated in this application with the control element 140. In alternative embodiments, the data structure 140 might be maintained external to the control element 140, but still accessible to the control element 140, such as in a network attached storage element coupled to the control element 140, or such as in a Internet-accessible database server with the control element 140 coupled to the Internet.

In one embodiment, the AP's 120 each send one or more messages to the control element 140 reporting the RSSI values they each have to report. In embodiments in which the data structure 141 is maintained at the control element 140, the control element 140 records information from those messages in the data structure 141. In alternative embodiments in which the data structure 141 is not maintained physically at the control element 140, but is accessible by the control element 140, the AP's 120 might send messages to a device where the data structure 141 is maintained, or might modify the data structure 141 themselves to add their information. Either way, the data structure 141 maintains the RSSI values reported by each AP 120.

The method 200 proceeds from the flow point 210.

Covering Subset

A flow point 210 indicates that the method 200 is ready to assign AP's 120 to a first channel 110.

As described below, the method 200 determines a subset of the AP's 120 that are sufficient to provide coverage, on the first channel 110, to as many stations 130 as possible. Once this subset of AP's 120 is determined, the method 200 can assign the remaining AP's 120 to one or more additional channels 110.

At a step 211, for each station 130, the method 200 finds the "best" AP 120 for that station 130, defined for this step as the AP 120 which has the best (that is, highest) RSSI value for that station 130. Having found the best AP 130 for that station 130, the method 200 finds a second-best AP 120 for that station 130, and computes a difference between the best RSSI value and the next best RSSI value. The method 200 assigns the RSSI difference, that is, the difference between the best RSSI value and the next best RSSI value, to the best AP 120 for that station 130.

The method 200 performs this step for each station 130. This has the effect of determining, for each station 130, its best AP 120 and the RSSI difference for that best AP 120. This also has the effect of determining, for each AP 120, its RSSI difference for each station 130.

At a step 212, for each AP 120, the method 200 finds the highest value of its RSSI difference over all stations 130, that is, the highest RSSI difference found when its RSSI value for all stations 130 are accounted for. This has the result that, if a particular AP 120 is the best AP 120 for only one particular station 130, its highest RSSI difference will be its RSSI difference for that one station. If a particular AP 120 is the best AP 120 for two or more stations 130, its highest RSSI difference will be the maximum of its RSSI differences for those two or more stations 130.

For each AP 120, the method 200 records its highest RSSI difference as a new goodness-index for that AP 120. Thus, the recorded goodness-index for an AP 120 will be the best RSSI difference the method 200 can find, for all stations 130 reported for that AP 120. To avoid the possibility of spurious values being reported, which might occur in response to noise or other fluctuations in RSSI values, the method 200 only records a new value for an AP's goodness-index when it obtains two consecutive new values for goodness-index higher than the most recent goodness-index, and when so, records the lower of those two consecutive new values as the AP's new goodness-index.

At a step 213, the method 200 marks all AP's 120 whose goodness-index is at least a threshold value of 3 dB as being assignable to the current channel 110. While this application primarily describes a method 200 which uses 3 dB as a threshold value for assigning AP's 120 to the current channel 110, in the context of the invention, there is no particular requirement for any such limitation. For a first example, the method 200 might use 2 dB or 4 dB for the threshold value, or any other selected value. For a second example, the method 200 might select the threshold value in response to a number of available communication channels 110, in response to a best RSSI difference among all AP's 120, in response to a number of AP's 120, or otherwise.

In one embodiment, when the method 200 assigns an AP 120 to a particular communication channel 110, the control element 140 records an association between that communication channel 110 and that AP 120 in a data structure, and sends a message to that AP 120 directing that AP 120 to use that communication channel 110. The data structure in which that association is recorded can be the same data structure 141, or alternatively, another data structure. In alternative embodiments, the AP's 120 can review that data structure for themselves, with any particular requirement that the control element 140 send messages to those AP's 120.

When an AP 120 is assigned to a particular communication channel 110, it generally listens for stations 130 desiring to receive or send messages using that communication channel 110, and sends its messages using that communication channel 110. However, the AP 120 might also listen to messages on a secondary communication channel 110 for other reasons. For example, the AP might listen on a secondary communication channel 110 for "emergency" or otherwise high-priority messages, or might listen on a secondary communication channel 110 for messages from other AP's or from the control element, or might listen on a secondary communication channel 110 for collecting information about traffic in the communication system 100, or otherwise.

At a step 214, the method 200 finds the one AP 120 with the lowest goodness-index and assigns that AP 120 to the next channel 110. If there is more than one AP 120 with that lowest goodness-index value, the method 200 selects one of them at random with equal probability. While this application primarily describes a method 200 which selects one of those AP's 120 at random, in the context of the invention, there is no particular requirement for any such limitation. For example, the method 200 might select one of those AP's 120 in response to another factor, such as a proximity to other AP's 120, or proximity to stations 130, or otherwise.

At a step 215, the method determines if there are any remaining AP's 120 whose goodness-index is less than the threshold value of 3 dB. If so, the method 200 returns to the flow point 210, and repeats the steps from the flow point 210 to this point, that is, the steps 211, 212, 213, and 214, until there are no more such AP's 120. When this occurs, the method 200 has completed assigning AP's 120 to the current channel 110, and moves to the next channel 110.

When the step 215 is finished, the subset of AP's 120 assigned to the current channel 110 include AP's which can operate on the current channel 110, and which provide substantially as much coverage as the entire original set of AP's 120. With respect to the current channel 110, those AP's 120 remaining for the next channel 110 are substantially redundant. The method 200 repeats the same technique for each next channel 110 in turn, until all AP's 120 have been assigned to a channel 110.

The method 200 proceeds from the flow point 220.

Next Channel

A flow point 220 indicates that the method 200 is ready to assign AP's 120 to a next channel 110.

At a step 221, with respect to the AP's 120 that were not already assigned to the first channel 110, the method 200 repeats the steps between the flow points 210 and 220, that is, the steps 211, 212, 213, 214, and 215, for each channel 110 in turn.

Thus, if there are 4 available channels 110, the method 200 performs those steps for the first channel, selecting a first subset of AP's 120 to assign to the first channel and a remaining group of AP's 120 which can be assigned otherwise. The method 200 repeats those steps for the second channel, selecting a second subset of AP's 120 to assign to the second channel and a remaining group of AP's 120 which can be assigned otherwise, and so on, until all remaining AP's 120 are assigned to the last available channel 110. The latter condition occurs when there are no AP's 120 in the current group being considered which are redundant and thus which can be moved to a next channel 110.

Redundant AP's

If the method 200 continues to have redundant AP's 120 but has no more channels 110 to which to move those redundant AP's 120, the method 200 can assign those redundant AP's 120 to support the AP's already assigned to a channel 110. For example, the method 200 might (1) assign those redundant AP's 120 to a channel 110 which could use backup in the event one of its AP's 120 fails to operate, (2) just leave those redundant AP's 120 on the channels 110 where they are already located, or (3) retry the channel 110 assignments with a different requirement, such as 2 dB instead of 3 dB.

After reading this application, those skilled in the art would notice that the subset of AP's 120 assigned to the first channel 110 provide as much coverage as the entire original set of AP's 120, and that the AP's 120 which remain for assignment to later channels 110 might not have as good coverage, they can still provide extended capacity by use of those later channels 110. Similarly, for each channel 110, the subset of AP's 120 actually assigned to that channel 110 provide as much coverage as the entire group of AP's 120 remaining for assignment to that channel 110 or later channels 110.

The method 200 proceeds from the flow point 200B.

End of Method

A flow point 200B indicates an end of the method 200. In one embodiment, the method 200 is repeated, from time to time, from the beginning at the flow point 200A.

We claim:

1. A computer-implemented method in a controller of a wireless communication network deploying multiple access points on multiple communication channels to optimize a coverage area while minimizing interference, the method comprising the steps of:
  collecting RSSI (received signal strength indicator) values for each station heard from each of a plurality of access points;
  assigning a subset of the plurality of access points to a first communication, comprising:
    determining a best access point per station based on the best access point having a highest RSSI value heard from the station;
    determining a second best access point per station based on the second best access point having a second highest RSSI value heard from the station;
    calculating an RSSI difference at each best access point between the highest RSSI value and the second highest RSSI value at a second best access point for each station;
    identifying a highest RSSI difference for each access point; and
    assigning access points with the RSSI difference above a predetermined threshold to a current communication channel, wherein the RSSI threshold indicates a lack of redundancy in coverage;
  recording an association between the assigned access points and corresponding communication channel in a data structure;
  assigning a second subset of with the RSSI difference below the predetermined threshold to at least a second communication channel, wherein the RSSI difference below the predetermined threshold indicates redundancy in coverage;
  sending messages to the plurality of access points with channel assignments; and
  handing-off a station from a first access point on the first communication channel to a second access point on the second communication channel without requiring reconfiguration to the second access point by the station other than changing channels.

2. The method of claim 1, further comprising:
  determining the RSSI difference for an access point by calculating the difference between a maximum RSSI value and a minimum RSSI value observed by the access point.

3. The method of claim 2, wherein at least one access point from the plurality of access points has at least two radios that operate on at least two different communication channels of the multiple communication channels, and wherein a corresponding radio to each of the at least two different communication channels is treated as a separate access point for the purposes of optimizing coverage while minimizing interference.

4. The method of claim 3, wherein each of the at least two different communication channels operate on a different frequency.

5. The method of claim 1, wherein collecting RSSI values from each station heard from each of a plurality of access points includes stations not currently served by a particular access point.

6. The method of claim 1, wherein the first communication channel uses the 2.4 GHz band and the second communication channel use the 5.0 GHz band.

7. The method of claim 1, further comprising:
  recording the corresponding RSSI values for the assigned access points in the data structure.

8. A non-transitory computer-readable medium storing instructions that, when executed by a processor, perform a method in a controller of a wireless communication network deploying multiple access points on multiple communication channels to optimize a coverage area while minimizing interference, the method comprising the steps of:
  collecting RSSI (received signal strength indicator) values for each station heard from each of a plurality of access points;
  assigning a subset of the plurality of access points to a first communication, comprising:
    determining a best access point per station based on the best access point having a highest RSSI value heard from the station;
    determining a second best access point per station based on the second best access point having a second highest RSSI value heard from the station;
    calculating an RSSI difference at each best access point between the highest RSSI value and the second highest RSSI value at a second best access point for each station;
    identifying a highest RSSI difference for each access point; and
    assigning access points with the RSSI difference above a predetermined threshold to a current communication channel, wherein the RSSI threshold indicates a lack of redundancy in coverage;
  recording an association between the assigned access points and corresponding communication channel in a data structure;
  assigning a second subset of with the RSSI difference below the predetermined threshold to at least a second communication channel, wherein the RSSI difference below the predetermined threshold indicates redundancy in coverage;
  sending messages to the plurality of access points with channel assignments; and
  handing-off a station from a first access point on the first communication channel to a second access point on the second communication channel without requiring reconfiguration to the second access point by the station other than changing channels.

9. The non-transitory computer-readable medium of claim 8, further comprising:
  recording the corresponding RSSI values for the assigned access points in the data structure.

10. A controller server of a wireless communication network deploying multiple access points on multiple communication channels to optimize a coverage area while minimizing interference, the controller server comprising:
  a processor; and
  a memory, storing:
    a first module to collect RSSI (received signal strength indicator) values for each station heard from each of a plurality of access points;
    a second module to assign a subset of the plurality of access points to a first communication, which comprises:
      determining a best access point per station based on the best access point having a highest RSSI value heard from the station;
      determining a second best access point per station based on the second best access point having a second highest RSSI value heard from the station;
      calculating an RSSI difference at each best access point between the highest RSSI value and the second highest RSSI value at a second best access point for each station;

identifying a highest RSSI difference for each access point; and assigning access points with the RSSI difference above a predetermined threshold to a current communication channel, wherein the RSSI threshold indicates a lack of redundancy in coverage;

a third module to record an association between the assigned access points and corresponding communication channel in a data structure;

a fourth module to assign a second subset of with the RSSI difference below the predetermined threshold to at least a second communication channel, wherein the RSSI difference below the predetermined threshold indicates redundancy in coverage;

a fifth module to sent messages to the plurality of access points with channel assignments; and a sixth module to hand-off a station from a first access point on the first communication channel to a second access point on the second communication channel without requiring reconfiguration to the second access point by the station other than changing channels.

11. The controller server of claim 10, further comprising:
recording the corresponding RSSI values for the assigned access points in the data structure.

* * * * *